Aug. 6, 1940.   W. A. BARNES   2,210,353
METHOD OF MANUFACTURING THREADED PARTS
Filed July 20, 1937   2 Sheets-Sheet 1
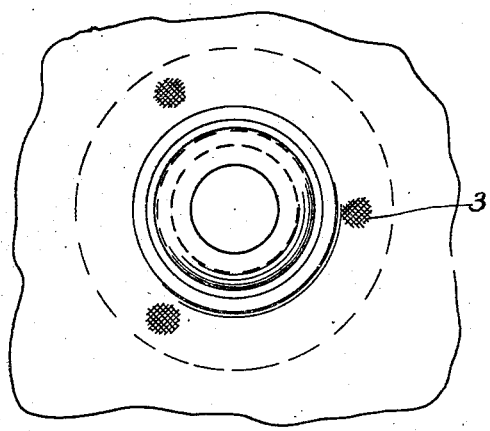
Fig 1
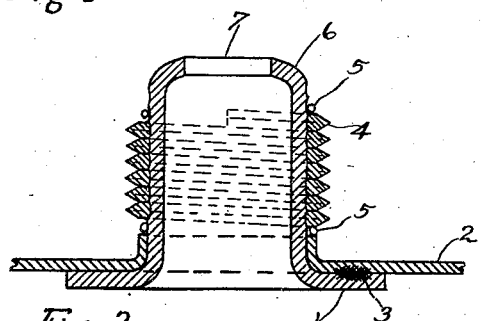
Fig 2
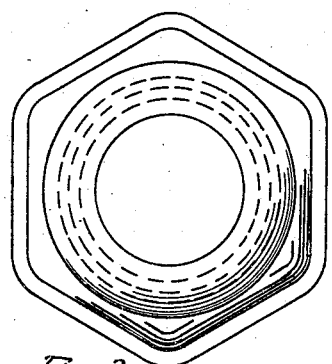
Fig 3
Fig 6
Fig 7
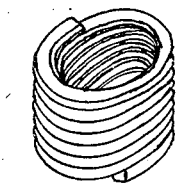
Fig 5
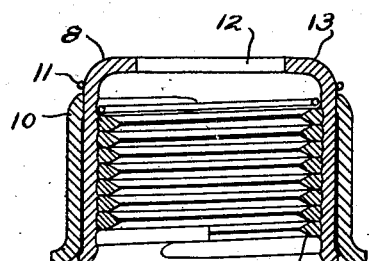
Fig 4
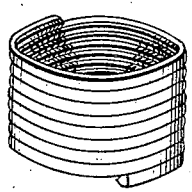
Fig 8
William A. Barnes INVENTOR.

Aug. 6, 1940.     W. A. BARNES     2,210,353
METHOD OF MANUFACTURING THREADED PARTS
Filed July 20, 1937     2 Sheets-Sheet 2

William A. Barnes   INVENTOR.

Patented Aug. 6, 1940

2,210,353

UNITED STATES PATENT OFFICE 2,210,353

METHOD OF MANUFACTURING THREADED PARTS

William A. Barnes, Mansfield, Ohio

Application July 20, 1937, Serial No. 154,610

3 Claims. (Cl. 29—148.2)

My invention relates to improvements in threaded parts, and to methods of manufacturing such parts at less cost than heretofore. More particularly my invention relates to improvements which reduce the cost of threaded connections to tanks, barrels, receivers, pressure containers and threaded couplings. One object of my invention is to provide a threaded connection to a brazed container, which will be assembled with the container and brazed thereto, usually at the same operation as brazes the seams and ends of the container. Another object of my invention is to reduce operations in the manufacture of containers by providing a threaded connection which may be inserted into a flanged opening in the container in the form of a helix or coil and brazed thereto, usually at the same brazing operation as brazes the seams and ends of the container.

Another object of my invention is to provide a threaded connection for a container which may be inserted into a hole in the container, in the form of a capsule containing a thread helix and brazed to the container, usually at the same brazing operation which brazes the seams and ends of the container. Another object of my invention is to make threads of full depth and strength on parts in which the body metal itself is insufficient in thickness to allow of the cutting of a full depth thread. Another object of my invention is to build up threads on sheet metal parts without cutting into the body metal of such parts, thus weakening them.

Still another object of my invention is to provide an economical means of connecting flared end tubing to a container by a threaded clamp nut binding the flared tubing to a projecting, threaded male member, and means of economically making such threaded parts, and more especially of making such threaded parts mainly of sheet metal stampings and as integral parts of the container.

Still another object of my invention is to make threads by coiling wire into a helix of proper pitch and inserting same into a recess, in the case of a female thread, or upon a tube or boss in the case of a male thread, and brazing the turns of the helix together and to the wall of the recess, tube or boss, and into an integral structure.

The invention consists of the parts and the construction and combination of parts as hereinafter more fully described and claimed, having reference to the accompanying drawings in which;

Figure 1 shows a top view of one form of my invention, and one in which a male thread is applied to a projecting member, which in turn, may be an integral part of a tank or other receptacle or a continuation of a tubular part.

Figure 2 shows a cross section of the same form of my invention as is shown in top view in Figure 1.

Figure 3 shows a top view of a similar form of my invention as that shown in Figure 1 and Figure 2 except that the arrangement of threads is female in form instead of male as in Figure 1 and Figure 2.

Figure 4 shows a cross sectional view of the same form of my invention as is shown in plan view in Figure 3.

Figure 5 shows as a separate part, the helix or coil which is used to form the threads in my invention. This particular view shows the helix for a female thread such as would be used in Figure 4.

Figure 6 shows a cross section of a helix wire such as would be used to form a male thread.

Figure 7 shows a cross section of a helix wire such as would be used to form a female thread.

Figure 8 shows how I propose to make the telescoping external parts for Figure 4 by cutting a deep drawn sheet metal part into two pieces and afterwards telescoping them into the assembly shown in Figure 4.

Figure 10:
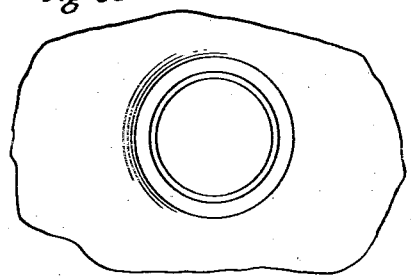
Figure 10 shows a top view of an adaptation of my thread invention in the female form, to a pierced and drawn opening as it might be used in a metal wall, or tank, barrel or other container.

Having described my invention in general, with reference to the drawings, I now desire to describe same in detail as follows—

In Figure 1 and Figure 2 I show one of the more advantageous forms in which my invention may be utilized, which is in the making of pressure or vacuum connections of tubing or pipe to refrigerator receivers, evaporators or condensers or to air tanks or to innumerable other uses for which connections of this kind are made. The parts for connections of this kind are usually turned from a solid bar or forging of brass or copper. The material used is costly and the major portion of it is cut away as scrap. I propose to use a drawn sheet metal stamping 1, usually of steel, and to spot weld or to press fit it into an opening in the wall of the container 2. In this case I show spot welds at 3. I then assemble upon the stamped part a helix 4, coiled from a special shaped wire which when coiled and in place will form suitable threads. It should be noted that the adjacent turns of the helix set closely together and that they are flattened where they come together so as to present a large surface to each other. It should also be noted that the sides of the wire opposite the thread forming portion are fitted closely to and in contact with the supporting member 1. I may even groove or roll a shallow thread in the supporting member so that the helix will be guided into proper place when assembled and held in such position throughout the subsequent processing operations.

Having assembled my thread helix to the supporting member, I next place a ring of copper wire 5 about, above or below the helix, or I may use copper filings, copper dust or I may even copper plate some portions of my assembly. I then heat the assembly in a furnace having a non oxidizing atmosphere, such as an atmosphere of hydrogen or methane, to a temperature slightly above that of the melting point of copper. The copper in the assembly will then melt and by capillary attraction will flow into all interstices and crevices between the adjacent metal parts, alloying with the surface metal of the parts and upon cooling strongly bonding all parts of the assembly together into one integral structure.

The copper bonding metal also flows between the parts 1 and 2 forming a fluid tight joint between these two parts and giving great strength to the sructure. The spot welding of these parts as at 3 is primarily to hold same in the assembled position until the copper brazing operation is complete. Wherever a press fit is used or other means to prevent displacement of the assembled parts, the spot welding is not necessary. Also during the brazing operation the copper bonding metal when melted has a lubricating action between adjacent surfaces of the metal parts which facilitates the displacement of the assembled parts unless they are held against such displacement.

It will be noted that I provide a rounded shoulder 6 to the part 1 against which a flared tube may be held for tight connections as is customary in such fittings. The hole 7 as shown punched in the end of part 1 may be omitted when it is desired to use a construction of this kind for the purpose of a threaded stud.

Figure 3 shows a top view of a female threaded form of my invention and one designed to cooperate with that shown in Figure 1 and Figure 2 to form the threaded parts of a connection fitting assembly.

Figure 4 shows a cross sectional view of the assembly shown in top view in Figure 3. Part 8 is the thread supporting part. Part 9 is the thread helix and 10 an external part of square or hexagon shape, which forms a strengthening outer member of suitable shape for a wrench grip by which the assembly may be turned in or out of place as is a nut. Part 11 is the copper wire in place as used for bonding metal. 12 is a hole in the end of the supporting member 8 which allows the nut to be threaded over a tube, rod or bolt. At 13 is shown an inturned flange adapted to grip a flared tube and to bind same against the corresponding seat 6 of Figure 2. I also show a shallow thread in the part 8 to position the thread helix. This shallow thread is not essential to my invention but it does assist in the positioning of the threads and holding same during the brazing operation. A straight surface to the supporting member and a corresponding straight side to the helix wire where it fits against the supporting surface will give excellent results altho somewhat more difficult to position.

Figure 5 shows a separate view of a female thread helix such as is used in constructions like that of Figure 4. It is important for the greatest strength and uniformity of threads that the turns of the helix be flat where they are adjacent and that they fit close together. The greatest strength is obtained in copper brazed structures by a very close fit of the parts and also the greatest economy of copper is obtained by a very close fit of the non copper parts.

Figure 6 shows a cross section of the helix wire as used for a male thread previous to coiling. It will be noted that the back side of the wire, or side opposite the thread forming surfaces is rounded or convex to fit into the groove in the supporting part. In case no such groove is to be used, this side of the helix wire will be flat or slightly concave. Also it should be noted that the side opposite the thread point is narrower than the same wire at the base of the thread. This is to compensate for distortion of the wire by the coiling. In coiling a male thread helix the wire will be thickened on the side opposite the point of the thread which is the inside of the coil. The shape of wire shown in Figure 6 is designed to compensate for the distortion during coiling and to provide for keeping the adjacent coil turn sides parallel.

Figure 7 shows a helix wire such as will be used for a female thread, previous to coiling. In this case the distortion will be opposite to that described in connection with Figure 6, hence the sides of the wire opposite the thread point is made wider than the base of the thread. The amount of this narrowing or widening of the helix wire opposite the thread point will be dependent upon the radius to which the wire is to be coiled and it is intended that this dimension be adjusted so that the final helix will have adjacent turns fitting closely together and with the adjacent wire sides as nearly parallel as is possible.

At Figure 8 is shown the method by which I propose to make the thread supporting shell and the external square or hexagon shell for parts as shown in Figure 4. I intend to draw the shell as shown in Figure 8 of double depth, round at the bottom of the shell, here shown at the top, and square, hexagon or any other desired shape at the top, here shown as the bottom. There will be a difference in diameter of the two portions of the shell about equal to twice the thickness of the metal of the walls, and also a shoulder where the portions of different diameter meet. I propose to cut this shell into two parts at the shoulder so as to obtain both the parts 9 and 10 of Figure 4. At 14 and 15 are shown portions of the lower and upper die parts respectively by which this cutting operation is performed. I then telescope these parts together into the assembly of Figure 4 in which they form the parts 8 and 10.

Figure 9:
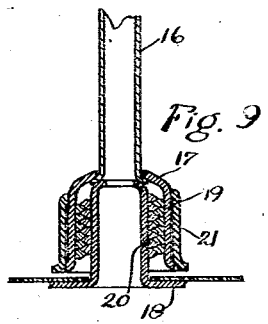
Figure 9 shows an assembly of the forms of my invention shown in Figure 2 and in Figure 4, into a pressure tube connection assembly as is customarily used in refrigeration systems.

Since the greatest strength of the brazed assembly and economy of copper bonding metal occurs when the parts of the assembly fit closely together, it will sometimes be found advisable to swage the severed edge of part 10 in Figure 9, in order to insure a tight fit of 10 about the outside of 8.

It will also be readily understood by those skilled in the art that I may achieve a similar assembly of my threaded part by reverse drawing the shell of Figure 8, that is, turning the upper half of the shell of Figure 8 within the lower half by methods well known in the metal working art. By this means I can eliminate the cutting and refitting together of the shell of Figure 8 into the parts 8 and 10 of Figure 4.

In Figure 9 I disclose a cross section view of an assembly of a threaded connector embodying the parts as shown in their individual assemblies of Figure 2 and of Figure 4 together with a flared tube as it would be held in position in an assembly of this kind. The flared tube is shown at 16 held by the nut rim 17 against the shoulder of the male threaded part 18. The female thread helix 19 is brazed to the shell 17 as shown in Figure 4. The outer shell 21, brazed to 17 is usually hexagon- and hence provides facilities for the turning of the nut shell 17 with a wrench. The outer shell may be omitted and the nut shell 17 turned by a pipe wrench or 17 may be knurled or ribbed to facilitate turning same.

In Figure 10 I show a plan view of my invention as applied to a threaded tank, barrel, or metal wall opening.

Figure 11:
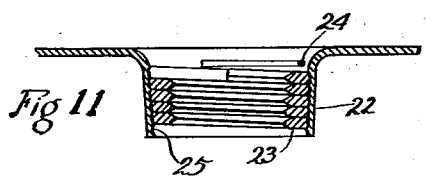
Figure 11 shows a cross sectional view of the same form of my invention as is shown in top view in Figure 10.

In Figure 11 I disclose a cross sectional view of the form of my invention shown in plan view in Figure 10. It will be noted that a flanged hole is provided in the metal wall. In the case of a pipe thread, which is tapered, the inturned flange should be tapered likewise, and as here shown at 22, a female helix 23, is positioned in the tubular opening formed by the inturned flanges of the hole and allowed to expand against the inside walls of the opening. The copper wire 24 provides bonding metal to flow between 22 and 23 and the adjacent turns of the helix 23, when same is melted at the temperature of the brazing operation, and to bond the assembly solidly together when it has cooled to a temperature below the freezing point of the bonding metal.

A structure as shown in Figures 10 and 11 is economical to make and has the advantage of providing a strong and rugged thread in a flange wall too thin to support a thread by any other means except by a threaded separate bushing. The tubular flange is shown provided with a shallow thread, 25, to position the helix and to prevent displacement of same during the operations preceding the brazing.

Figure 12:
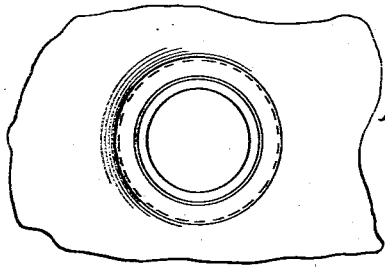
Figure 12 shows a top view of a similar form of my invention, but one in which the thread helix is assembled into a separate capsule which in turn is assembled to and brazed to the metal wall, tank, barrel or other container.
Figure 13:
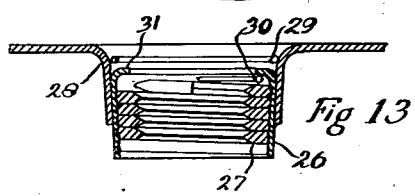
Figure 13 shows a cross sectional view of the same form of my invention as is shown in top view in Figure 12.

The structures of Figures 10 and 11 will less easily be made liquid tight and proof against leaks than another form of my invention which I show in plan view in Figure 12 and in cross section in Figure 13. Here it will be seen that I have provided a separate capsule 26, or thread holding shell in which the thread helix 27 is positioned, and which in turn is placed in the opening in the metal wall 28. The copper wires 29 and 30 provide bonding metal for the brazing of the capsule to the metal wall and for the brazing of the helix threads together and to the capsule respectively. I find that by heavily copper plating the capsule 26 that I may dispense with the use of any copper wire at all, as such a copper plate will provide ample bonding metal for most assemblies. By the use of a threaded male part 10 with a shoulder which will fit down tightly against the inturned flange 31, of the capsule, with or without an intervening gasket, an absolutely gas or fluid tight joint can be easily achieved.

Figure 14:
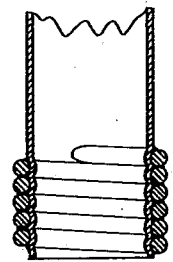
Figure 14 shows a cross sectional view of my invention in a more elemental form in which it may be used to provide threads on a tube end.

In Figure 14 I disclose the simplest and most elemental form which my invention may take. Here I show a tube end threaded very shallowly to position the thread helix and a simple thread helix of round wire set into the groove of the shallow thread. A bonding metal, usually copper is brazed between the adjacent turns of the thread helix and between the helix and the tube. This is a very simple form of my thread invention which will find application to containers, utensil handles and numerous places where a not close fitting but rigid thread is desirable.

Figure 15:
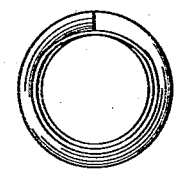
Figure 15 shows a top view of the same form of my invention as is shown in cross section in Figure 14.

At Figure 15 I show an end view of the threaded tube end of Figure 14.

I reserve the right to use in my invention, a thread helix of wire of any desired shape, form or cross section, from the simple round of Figure 14 and Figure 15 to the polygonal cross sections of Figure 6 and Figure 7. Intermediate shapes may be of simple triangular cross section or round with more or less flattened sides arranged at suitable angles. By the use of thread helix wires of the proper shapes I can reproduce any of the common screw or pipe threads in commercial use.

It will be apparent to those skilled in the art, from the preceding description, that I have invented a new and novel means of constructing the threads in articles to be provided with screw threads of any form, but a means which will be in particular, of great advantage for providing threaded connections to fluid tight or to thin walled containers which are also to be brazed at some joint or seam. Since the greatest cost of making threads as I have herewith disclosed is the cost of the brazing operation, my invention will be most economical when used on articles which also have to be brazed for some other reason such as a seam or attached part.

By my invention the provision of threads in a thin walled article is simplified because the threads themselves strengthen and reinforce the wall at the point where they are inserted, whereas heretofore threads have been cut into the metal with a resultant removal of metal and weakening of the wall.

Also it is now possible by my invention, to manufacture threaded parts in which the threads run up to a shoulder without the necessity of providing room for one or more imperfect threads next to the shoulder. All the common methods of manufacturing threads do not provide means to closely approach a shoulder without one or more imperfect threads next to the shoulder. By my invention, because the threads are built up on the part to be threaded instead of being cut from the metal of the part, it is possible to provide perfect threads up to the point of contact with a shoulder.

It will be apparent to those skilled in the art, that altho I have provided shallow threads to position the thread helix in all of the forms of my thread here shown, such shallow threads can be dispensed with without losing the main advantages of my invention. Altho such shallow threads in the helix supporting member assist in the proper location of the helix and in holding it in position during the brazing operation in which the copper bonding metal acts as a lubricant to encourage displacement, when it is melted, I am nevertheless able to construct threads wherein the helix is simply pushed into or upon the plain supporting member and brazed thereto, and secure excellent results thereby.

In most cases it will be found advisable to make the principle parts of my invention from sheet steel stampings and to coil the thread helix parts from steel wire of polygonal cross section, and to braze the assembled parts together in electric furnaces having a hydrogen or methane atmosphere and using copper as the bonding metal. However, other materials may be used for the principal parts of my invention and for the thread helix parts. Brass bronze or copper may be used for the above purposes, and used with various grades of brass, bronze or tin as the bonding metal. The bonding metal must always have a lower melting point than the metal of the assembly, and should preferably be a metal which will alloy with the surface metal of the assembly parts, as copper alloys with the surface of a steel part when melted upon the steel in a non-oxidizing atmosphere.

I wish it understood that various changes in form, proportions and minor details of construction may be resorted to within the scope of the appended claims and that I do not wish to limit myself to the specific designs and constructions here shown.

I claim:

1. A method of making screw threads comprising forming a resilient wire helix in which adjacent convolutions are substantially in contact with each other throughout the length of the helix, forcing the helix onto a cylindrical metal supporting member coaxial with the helix and having an external diameter larger than the original internal diameter of the helix, placing bonding metal on the assembly exteriorly of the helix, heating the assembly to fuse the bonding metal, causing the fused bonding metal to flow into the interstices between the convolutions of the helix and between the helix and the supporting member, and cooling the assembly to solidify the bonding metal.

2. A method of making screw threads comprising forming a resilient wire helix in which adjacent convolutions are substantially in contact with each other throughout the length of the helix, forcing the helix onto a cylindrical metal supporting member co-axial with the helix and having an external diameter larger than the original internal diameter of the helix, incorporating bonding metal onto the assembly adjacent the said helix, heating the assembly to fuse the bonding metal, causing the fused bonding metal to flow into the interstices between the convolutions of the helix and between the helix and the supporting member, and cooling the assembly to solidify the bonding metal.

3. A method of making screw threads comprising forming a resilient wire helix in which adjacent convolutions are substantially in contact with each other throughout the length of the helix, telescoping the said helix upon a cylindrical metallic supporting means of such diameter that the helix closely fits the said supporting means, incorporating bonding metal onto the assembly adjacent the said helix, heating the assembly to fuse the bonding metal, causing the fused bonding metal to flow into the interstices between the convolutions of the helix and between the helix and the supporting member, and cooling the assembly to solidify the bonding metal.

WILLIAM A. BARNES.